US009678715B2

(12) United States Patent
Burgess et al.

(10) Patent No.: US 9,678,715 B2
(45) Date of Patent: Jun. 13, 2017

(54) MULTI-ELEMENT COMPARISON AND MULTI-ELEMENT ADDITION

(71) Applicant: ARM LIMITED, Cambridge (GB)

(72) Inventors: Neil Burgess, Austin, TX (US); David Raymond Lutz, Austin, TX (US)

(73) Assignee: ARM Limited, Cambridge (GB)

( * ) Notice: Subject to any disclaimer, the term of this patent is extended or adjusted under 35 U.S.C. 154(b) by 295 days.

(21) Appl. No.: 14/528,326

(22) Filed: Oct. 30, 2014

(65) Prior Publication Data

US 2016/0124715 A1   May 5, 2016

(51) Int. Cl.
| | | |
|---|---|---|
| *G06F 7/50* | (2006.01) | |
| *G06F 17/16* | (2006.01) | |
| *G06F 7/02* | (2006.01) | |
| *G06F 7/544* | (2006.01) | |
| *G06F 7/57* | (2006.01) | |

(Continued)

(52) U.S. Cl.
CPC ............... *G06F 7/50* (2013.01); *G06F 7/02* (2013.01); *G06F 7/509* (2013.01); *G06F 7/544* (2013.01); *G06F 7/57* (2013.01); *G06F 9/3001* (2013.01); *G06F 9/30021* (2013.01); *G06F 9/30036* (2013.01); *G06F 17/16* (2013.01)

(58) Field of Classification Search
CPC ... G06F 7/02; G06F 7/026; G06F 7/50; G06F 7/509; G06F 7/544; G06F 7/57–7/575; G06F 9/30021; G06F 9/30036; G06F 17/16
USPC .................................................. 708/207, 671
See application file for complete search history.

(56) References Cited

U.S. PATENT DOCUMENTS

| | | |
|---|---|---|
| 4,839,845 A | 6/1989 | Rusterholz et al. |
| 5,991,785 A | 11/1999 | Alidina et al. |

(Continued)

FOREIGN PATENT DOCUMENTS

| | | |
|---|---|---|
| GB | 1 098 329 | 1/1968 |
| GB | 1 373 938 | 11/1974 |

OTHER PUBLICATIONS

Laxmi Kumre, Ajay Somkuwar and Ganga Agnihotri, "Power Efficient Carry Propagate Adder", Int J VLSI Des Commun Syst (VLSICS), vol. 4, No. 3, 2013.*

(Continued)

*Primary Examiner* — Matthew Sandifer
(74) *Attorney, Agent, or Firm* — Nixon & Vanderhye P.C.

(57) ABSTRACT

An apparatus 8 for performing a selectable one of multi-element comparison and multi-element addition is formed from a carry propagate adders stage 12 supplied with four non-final intermediate operands formed from the input vector, a non-final limit value selecting stage 14, which when performing a multi-element comparison serves to select, in dependence upon at least carry save values generated by the carry propagate adder, limit values that are of a larger or a smaller value of a pair of elements. A final intermediate operand forming stage 16 forms final intermediate operands from two non-final intermediate sum values from the carry propagate adders stage 12 and supplies these to a final output adder stage 18 which forms a sum of these two final intermediate operands to generate an output operand which can be either one or more candidates for limit values that will be a maximum or minimum value, or a sum value, or partial sum values in the case of a multi-element addition.

13 Claims, 10 Drawing Sheets

(51) Int. Cl.
*G06F 9/30* (2006.01)
*G06F 7/509* (2006.01)

(56) References Cited

U.S. PATENT DOCUMENTS

| | | | | |
|---|---|---|---|---|
| 6,470,440 | B1* | 10/2002 | Nguyen | G06F 9/30021 |
| | | | | 708/207 |
| 6,484,193 | B1 | 11/2002 | Choe et al. | |
| 8,461,902 | B2* | 6/2013 | Dvorak | H03K 17/005 |
| | | | | 327/407 |
| 2011/0095785 | A1* | 4/2011 | Stortz | G06F 7/02 |
| | | | | 326/105 |
| 2011/0099214 | A1* | 4/2011 | Stortz | G06F 7/544 |
| | | | | 708/201 |
| 2013/0262819 | A1* | 10/2013 | Iyer | G06F 9/30021 |
| | | | | 712/36 |
| 2014/0207836 | A1* | 7/2014 | Mundarath | G06F 7/026 |
| | | | | 708/201 |
| 2015/0052330 | A1 | 2/2015 | Ingle et al. | |

OTHER PUBLICATIONS

UK Search Report dated Mar. 18, 2016 issued in GB 1516457.7, 5 pages.

\* cited by examiner

MULTI-ELEMENT COMPARISON AND MULTI-ELEMENT ADDITION

BACKGROUND

Field

This disclosure relates to the field of data processing systems. More particularly, this disclosure relates to data processing systems supporting multi-element comparison and then multi-element addition operations.

Prior Art

It is known to provide for "lane reduction" operations within data processing systems that return the signed or unsigned sum of elements of a vector or the minimum or maximum of all the elements in the vector. A conventional way of implementing such operations is to separately provide a carry save reduction tree to perform the addition and circuitry to perform a series of full-word length element comparisons to determine the minimum and maximum values. Such an approach consumes circuit resource due to the provision of separate circuitry implementing the different types of operation. Furthermore, the full-word length element comparisons are relatively slow to perform.

SUMMARY

Viewed from one aspect the present disclosure provides an apparatus comprising:
one or more non-final reduction stages, each non-final reduction stage comprising:
 a non-final intermediate operand forming stage to form non-final intermediate operands from one of an input vector and intermediate sum values output from a preceding non-final reduction stage;
 a carry propagate adders stage to add respective pairs of said non-final intermediate operands to form intermediate sum values; and
a final reduction stage comprising:
 a final intermediate operand forming stage to form final intermediate operands from intermediate sum values output from a last one of said one or more non-final reduction stages; and
 an output adder stage to generate an output operand by adding said final intermediate operands; wherein,
 said apparatus is arranged to perform a selectable one of multi-element comparison and multi-element addition.

The use of a carry propagate adders stage performs part of the comparison operation while also supporting part of the addition operation with the same hardware. Then, by appropriately formatting the intermediate sums which have been generated, either at least a further part of the comparison or at least a further part of the addition may be performed. This permits the same hardware to be used to perform both the comparison operation and the addition operation with the comparison operation being performed typically more rapidly then by using full-word length element comparisons.

Viewed from another aspect the present disclosure provides an Apparatus comprising:
one or more non-final reduction stages, each non-final reduction stage comprising:
 non-final intermediate operand means for forming non-final intermediate operands from one of an input vector and intermediate sum values output from a preceding non-final reduction stage;
 carry propagate adders means for adding respective pairs of said non-final intermediate operands to form intermediate sum values; and
a final reduction stage comprising:
 final intermediate operand forming means for forming final intermediate operands from intermediate sum values output from a last one of said one or more non-final reduction stages; and
 output adder means for generating an output operand by adding said final intermediate operands; wherein
 said apparatus is arranged to perform a selectable one of multi-element comparison and multi-element addition.

Viewed from another aspect the present disclosure provides a method comprising the steps of:
within each of one or more non-final reduction stages:
 forming non-final intermediate operands from one of an input vector and intermediate sum values output from a preceding non-final reduction stage;
 carry propagate adding respective pairs of said non-final intermediate operands to form intermediate sum values; and
within a final reduction stage:
 forming final intermediate operands from intermediate sum values output from a last one of said one or more non-final reduction stages; an
 generating an output operand by adding said final intermediate operands; wherein said method performs a selectable one of multi-element comparison and multi-element addition.

DRAWINGS

Embodiments of the disclosure will now be described, by way of example only, with reference to the accompanying drawings in which;

FIG. 1 schematically illustrates the operation of lane reduction instructions in the form of both multi-element comparisons and a multi-element addition;

FIG. 2 schematically illustrates a hardware apparatus for performing a selectable one of multi-element comparison and multi-element addition and including one non-final reduction stage and one final reduction stage;

FIG. 3 schematically illustrates example forms of second intermediate operands;

FIG. 4 schematically illustrates a multi-element comparison operation with eight elements;

FIG. 5 schematically illustrates a multi-element comparison operation with four input elements;

FIG. 6 schematically illustrates a multi-element addition operation with eight input elements;

FIG. 7 schematically illustrates a multi-element addition operation with four input elements;

Figure 10:
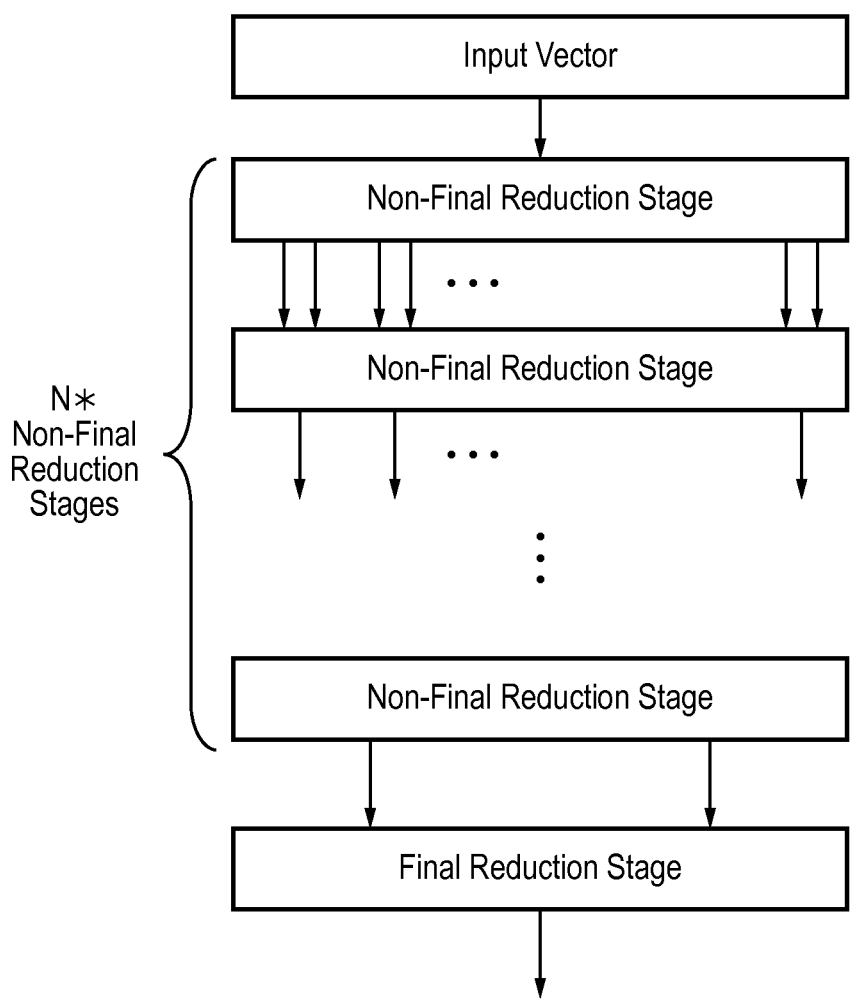

FIG. 10 schematically illustrates a hardware apparatus for performing a selectable one of multi-bit element comparison and multi-element addition and including a plurality of non-final reduction stages and one final reduction stage.

EMBODIMENTS

It will be appreciated that the input vector operand can take a variety of different forms. In some embodiments the vector input operand may comprise N X-bit elements, where X is a selectable positive integer value and N is an integer value of four or more where each of the non-final intermediate operands contain N/4 X-bit elements.

The carry propagate adders stage may comprise carry propagate adder circuits of various widths. In some example embodiments, the carry propagate adders stage comprises M Z-bit carry propagate adder circuits, where Z is less than or equal to a minimum value of X that can be selected as the element size and M*Z is equal to N*X.

In embodiments in which Z is less than X, the carry propagate adder circuits are narrower than the element sizes between which comparisons are being made. In some embodiments the non-final limit value selecting stage may select the limit values in dependence upon both carry values and propagate values generated by the carry propagate adder circuits. Thus, for example, if two elements are being compared using subtraction performed by a plurality of carry propagate adder circuits, then the selection may be steered by the carry output of the carry propagate adder performing the most significant bit portion of the compare operation. If this carry output is not set, but the propagate output for that carry propagate adder is set (indicating that a carry bit will propagate through that carry propagate adder), then the carry output of the next lower (in bit significance order) carry propagate adder is considered. Successively lower carry propagate adders will be considered until one of these does not have its propagate bit set, or they have all been considered. Thus, in such circumstances, the non-final limit value selecting stage selects the limit values in dependence upon both carry values and propagate values generated by the carry propagate adder circuits.

The non-final limit value selecting stage may serve to select half of the input operand elements as being one of the larger value or a smaller value from a respective pair of these elements. The compare operation can be seeking a maximum value or a minimum value.

When performing a multi-element comparison, the final intermediate operand forming stage may serve to form each of the two separate intermediate operands to comprise a selected limit value. It will be appreciated that multiple candidate limit values, which may ultimately be selected to be the maximum or the minimum value, may be represented within the final intermediate operands. Furthermore, when the apparatus is performing multi-element addition, the final intermediate operands may instead represent a sum of element values output from the carry propagate adders stage that is to be subject to further addition by the output adder stage.

When the apparatus is serving to perform multi-element comparison, the output adder stage serves to compare the limit values of the final intermediate operands. This may be performed using a subtraction operation.

Where each of the final intermediate operands contains multiple limit values, then these may be separated by at least one zero bit disposed between the limit values when the final intermediate operands are formed by the final intermediate operand forming stage. This zero bit can be used as a carry indicating bit when the output adder compares the two limit values and accordingly may be used to steer the selection of a limit value(s). The positions of the zero bits introduced by the final intermediate operand performing stage will vary depending upon the size of the limit values contained within the final intermediate operands. Furthermore, the selection of the bit to serve as the carry bit indicating the result of the comparison operation will also vary depending upon the size of the limit values being compared.

When the apparatus is performing multi-element addition, then the outputs from the carry propagate adders may include carry bits which need to be taken into account when the full sum is performed. In order to achieve this the final intermediate operand forming stage extends outputs from half of the carry propagate adders to represent carry bits generated by all the carry propagate adders. These carry bits may thus be pre-summed before the sum is performed by the output adder stage.

Figure 1:
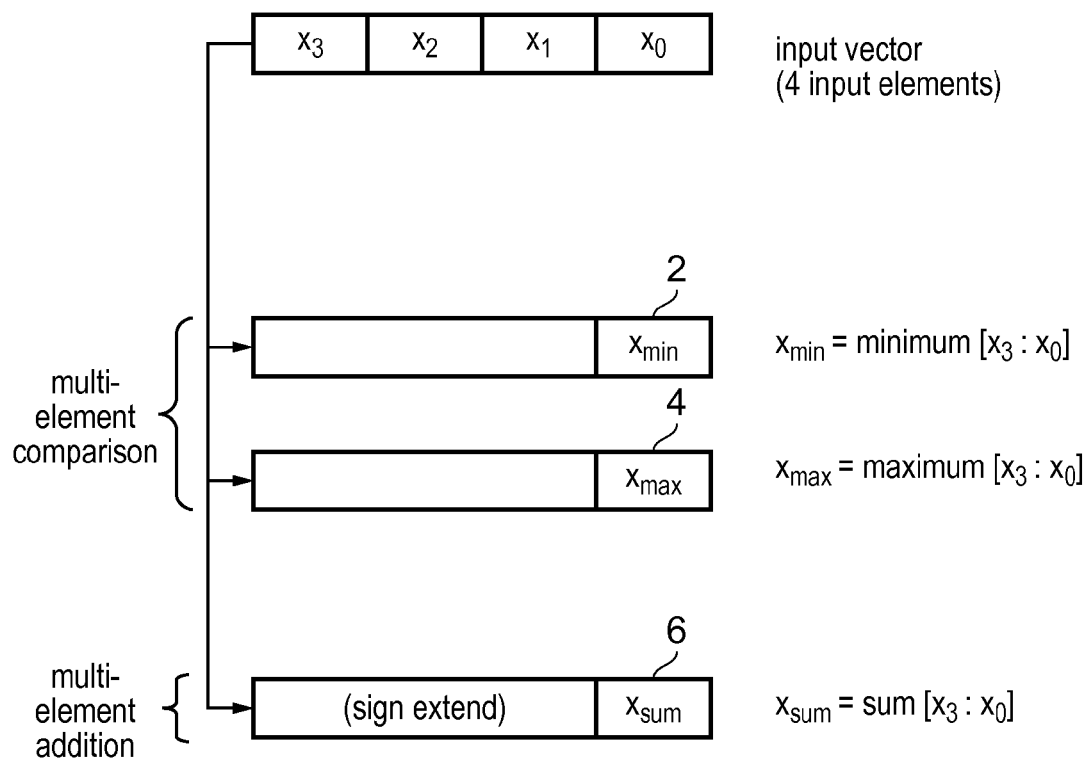

FIG. 1 illustrates different types of lane reduction instructions which may be performed in accordance with the apparatus and methods of the present disclosure. This particular example performs a 4:1 reduction.

In the example illustrated the input vector comprises four input elements. These may be subject to multi-element comparison operations producing either a minimum element value 2 as output or a maximum value 4 as output. The same apparatus as discussed below may also perform a multi-element addition to produce an output sum value 6 (possibly sign extended). This sum value will have a greater bit width than the individual elements.

It will be appreciated that FIG. 1 illustrates an example of an input vector having four elements. The apparatus in this disclosure may be used with input vectors of various lengths. For example, a 128-bit input vector may be formed of four 32-bit elements, eight 16-bit elements or sixteen 8-bit elements. It is also possible that the input vector may be a 64-bit input vector, in which case it may comprise four 16-bit elements or eight 8-bit elements. Other possibilities are also available. If an individual element is not required for use, then the input vector may be padded with zero values or the relevant lanes operation gated off. The input elements may be signed or unsigned numbers.

Figure 2:
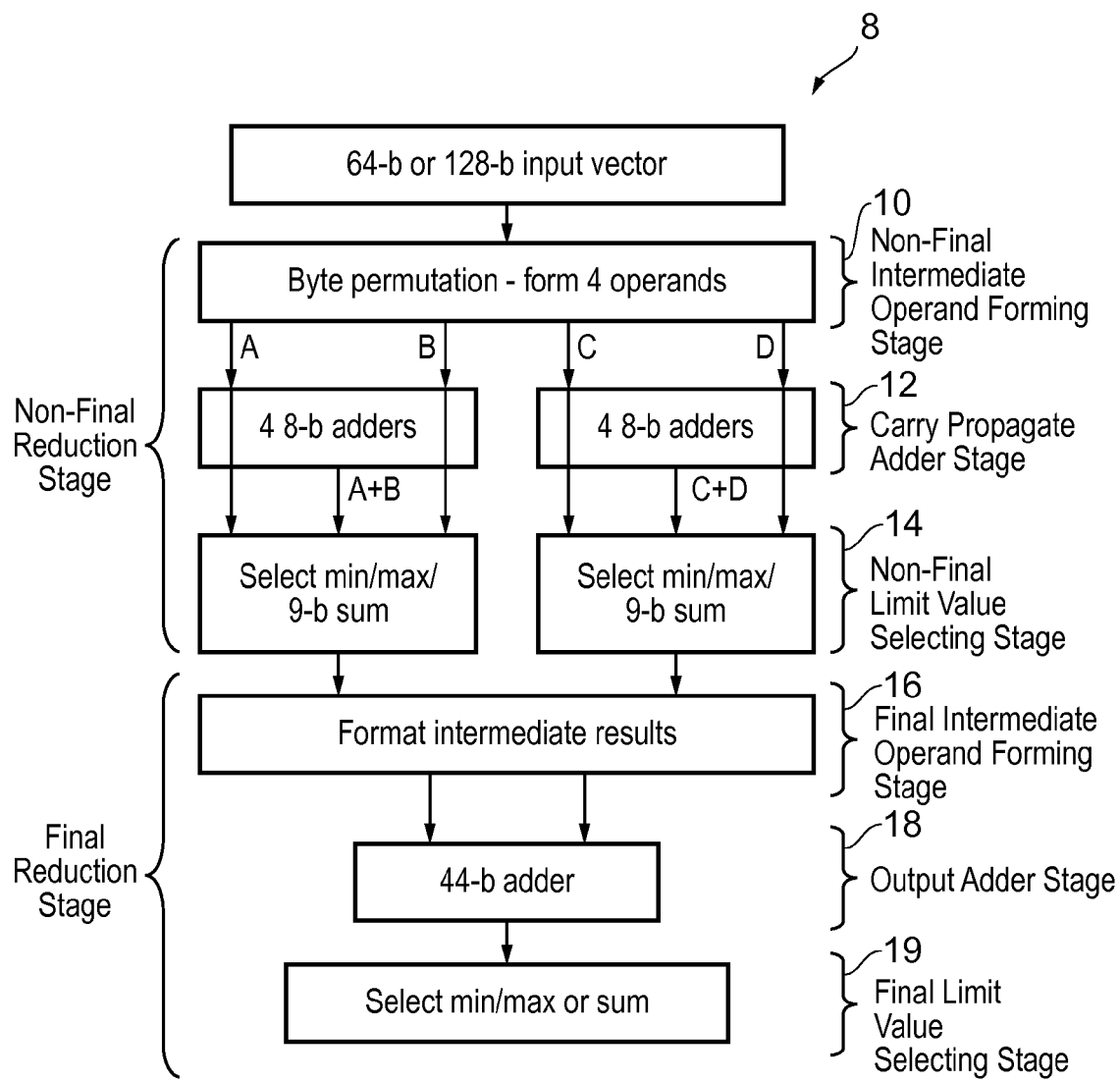

FIG. 2 schematically illustrates an apparatus 8 for performing a selectable one of a multi-element comparison or a multi-element addition. This example includes one non-final reduction stage and one final reduction stage. This apparatus 8 is formed of a non-final intermediate operand forming stage 10, a carry propagate adders stage 12 formed of a plurality of individual carry propagate adders (in this example 8-bit carry propagate adders), a limit value selecting stage 14, a final intermediate operand forming stage 16, an output adder stage 8 and a final limit value selecting stage 19. The stages 10, 12 and 14 form a non-final reduction stage and the stages 16, 18 and 19 form a final reduction stage. Different embodiments may use different numbers of non-final reduction stages to support different reduction ratios.

The apparatus 8 reduces an eight element input vector to two elements or a four element input vector to one element.

The non-final intermediate operand forming stage 10 serves to permute the bytes of the input vector into a four 32-bit non-final intermediate operands A, B, C, D. The permutation is such that corresponding bytes of 32-bit elements are aligned if the element size is 32-bits; all corresponding bytes of 16-bit or 8-bit elements are aligned otherwise. This permutation supports both 64-bit and 128-bit vector sizes by zeroing the upper half of all four operands if the vector is a 64-bit input vector.

The four non-final intermediate operands A, B, C, D are added using the 8-bit carry propagate adders within the carry propagate adders stage 12. Such carry propagate adders are slightly slower and larger than carry save adders but provide the feature of generating both carry and propagate output bits, which can be combined to permit steering selections of limit values (maximums or minimums), as well as performing additions. The carry signals of the 8-bit carry propagate adders are combined as a function of the vector element size to select the larger or the smaller of the elements within the operand pairs when performing comparison operations.

When performing a multi-element addition operation, the carry bits of corresponding intermediate sum values with A+B, C+D are half added by the final intermediate operand forming stage 16, in accordance with whether the operation is signed or unsigned, so as to sign extend the sum of one of each pair of the carry propagate adders by two bits. The non-final limit value selecting stage 14 performs the selection of the minimum or maximum element depending upon the carry bits observed from the 8-bit propagate adders (as identified by the vector element size).

The final intermediate operands output from the final intermediate operand forming stage 16 are thus either the larger or smaller of two pairs of operands if a minimum/maximum comparison is being performed or partially added 8-bit and 10-bit sums of pairs of operands.

Figure 3:
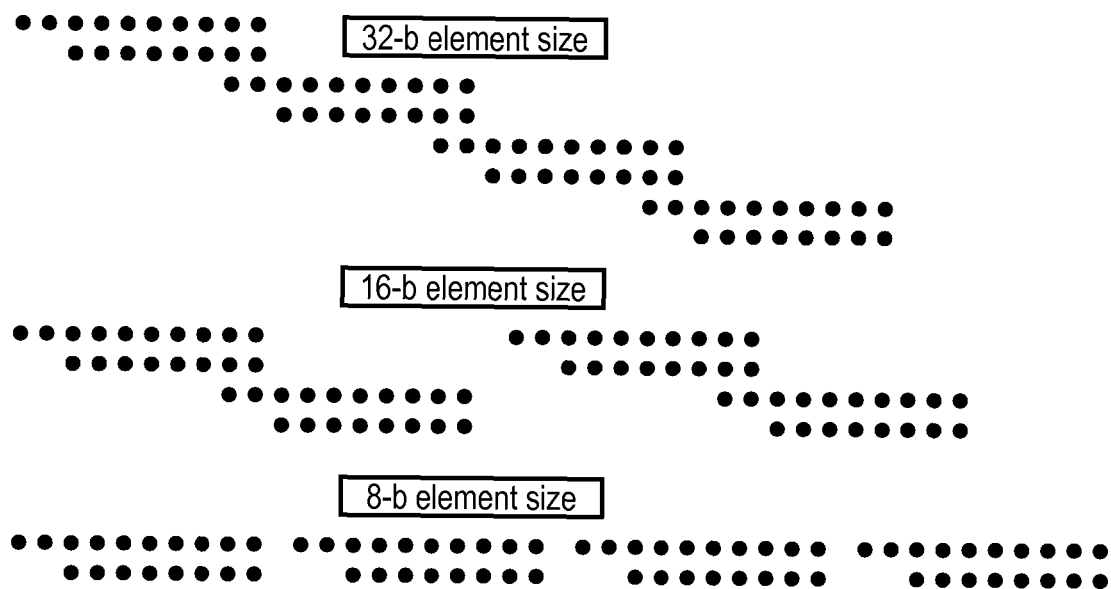

The final intermediate operand forming stage 16 serves to align the intermediate results in accordance with the element size as shown in FIG. 3, where the dots represent bits and the columns represent bit significances. If a vector minimum/maximum is being performed, then the top two bits of each 10-bit intermediate sum are zero. If a vector sum is being performed, then the intermediate results are full added so as to reduce three bits in any column to two. Then the formatted (and, in the case of a vector sum, fully added) operands are added using the output adder stage which is a 44-bit carry propagate bit adder. The formatting prevents carry bits of shorter vector elements from propagating into other vector elements in the 44-bit propagate adder. The output adder stage 18 returns the final sum for a vector addition operation or the carry bits for identifying the correct vector element(s) for a minimum/maximum operation as will be selected by the final limit value selecting stage 19. In a case of a lengthening vector sum operation, the result is sign-extended by repeating the most significant bit of each element sum.

Figure 4:
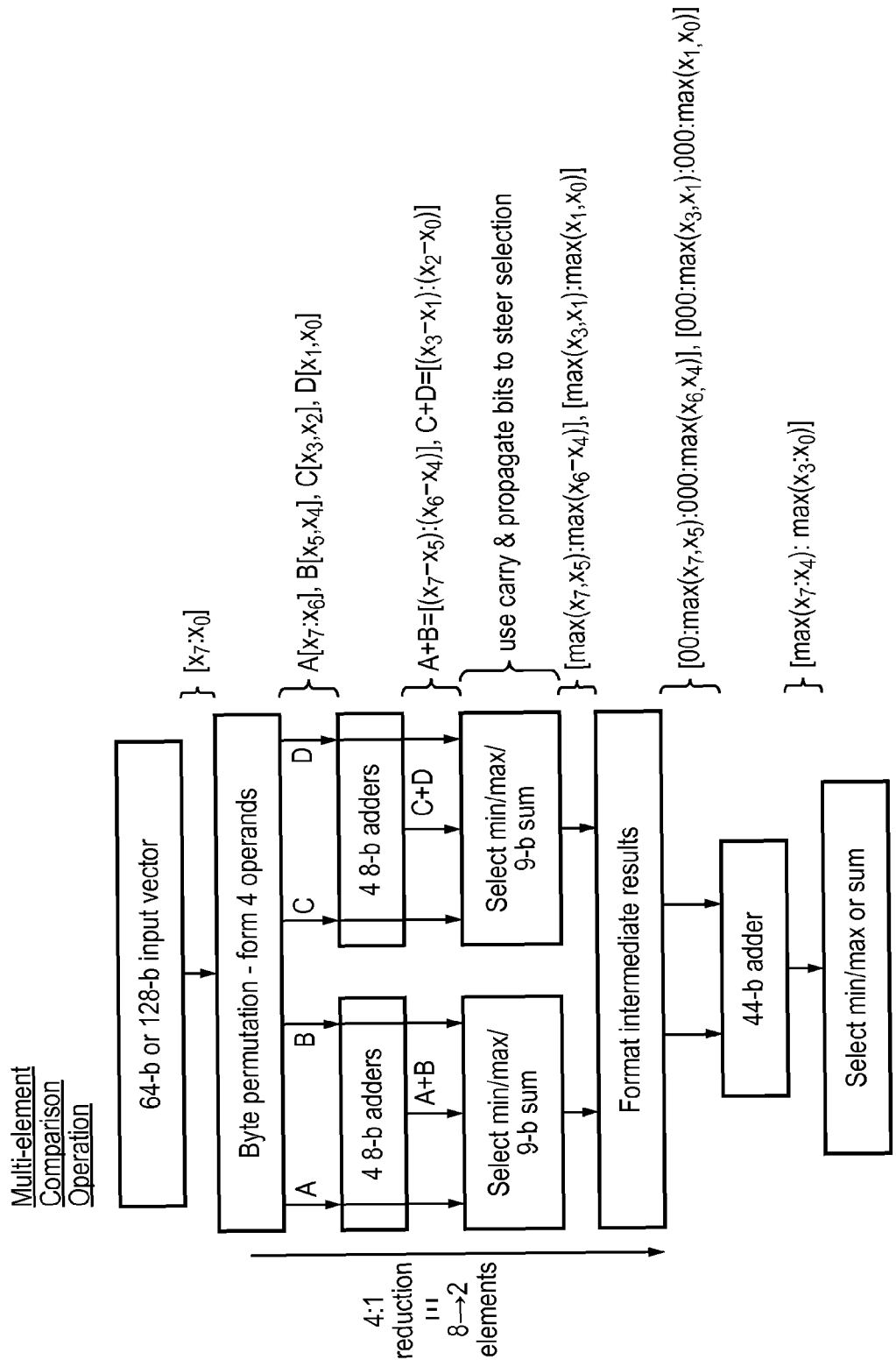

FIG. 4 schematically illustrates the operation of a multi-element comparison operation performed upon eight input elements. The non-final intermediate operand stage 10 forms four non-final intermediate operands each comprising two of the elements. The carry propagate adders stage then adds respective pairs of the four non-final intermediate operands to form two non-final intermediate sum values. The non-final limit value selecting stage 14 uses the carry and propagate bits from these sums to steer the selection of limit values (intermediate limit values) with the carry and propagate bits concerned being selected in dependence upon the element size. This selection operation by the non-final limit value selecting stage 14 is not performed when a multi-element addition operation is being performed. The output from the non-final limit value selecting stage 14, in this example, is four candidate maximum values.

The final intermediate operand forming stage 16 then forms the two final intermediate operands in accordance with the formats illustrated in FIG. 3, and in particular with zero values separating the four non-final intermediate values.

The output adder stage 18 then performs a further carry propagate add. Using carry bits of of this addition, two candidate maximum values may be selected in the final limit value selecting stage 19.

As the apparatus 8 performs a 4:1 reduction, and this operation started with 8 input elements, the two candidate maximum values need to be recirculated through the circuit or otherwise processed so that that the final maximum value may be identified. Other lane reduction may also be provided, such as, for example 16:4 reduction by performing four 4:1 reductions in parallel. A 2:1 reduction may be performed by supplying the two elements at the input and then suppressing the action the carry propagate adders stage and using the output adder stage to perform the 2:1 comparison or addition as required.

The technique described for allowing the 44-bit carry propagate adder to function to generate multiple sums by inserting spacing bits into the operands supplied to it (to stop carry propagation) may also be used to provide the carry propagate adders stage in the form, for example, of a single wide carry propagate adder with appropriate formatting of the input operands supplied thereto so as to yield multiple separate carry propagate adders.

Figure 5:
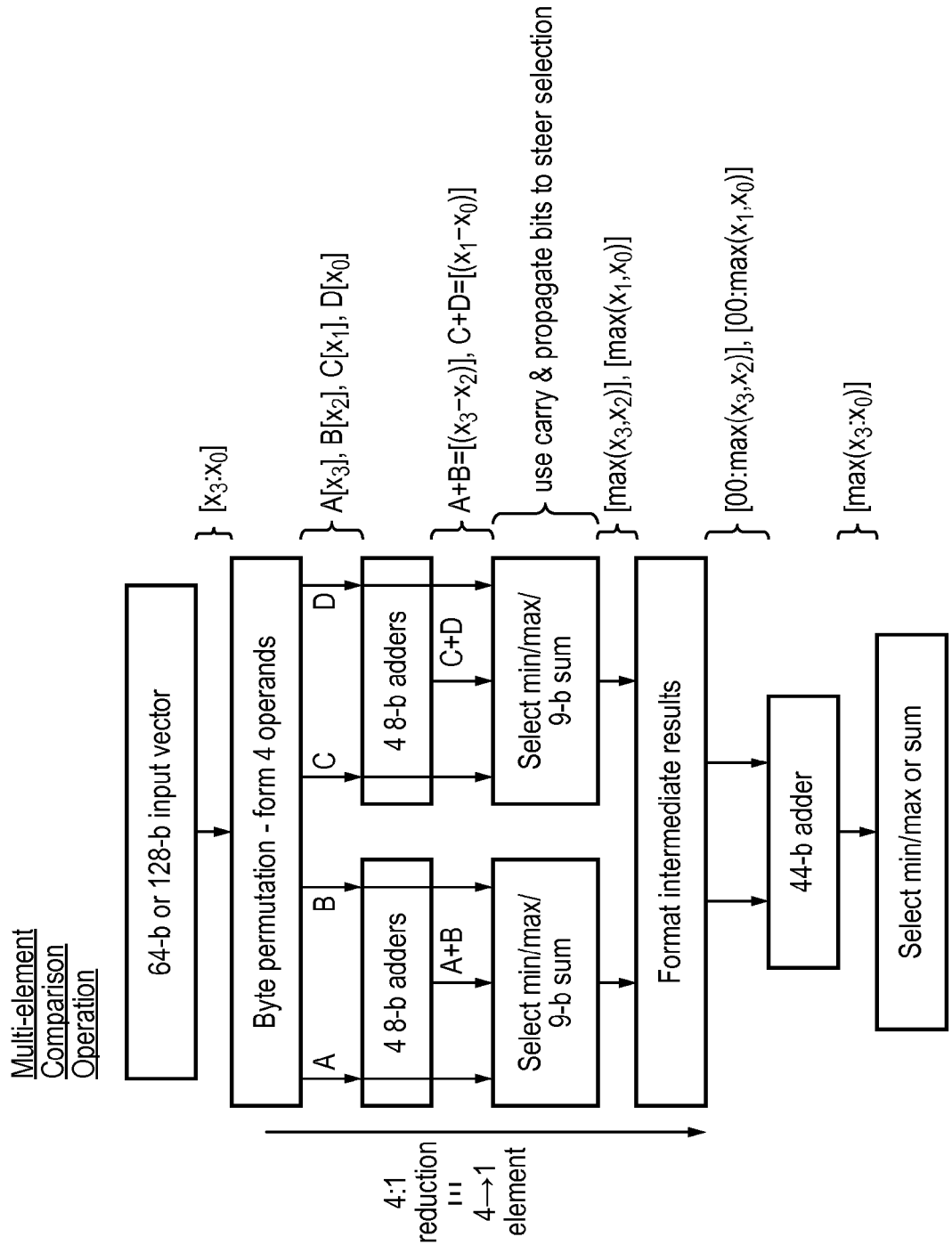

FIG. 5 illustrates another example of multi-element comparison operation. This is similar to that of FIG. 4 except that the input vector in this case comprises four elements. The final output from the final limit value selecting stage 19 is accordingly a single value which is the maximum value of the four elements input within the input vector.

Figure 6:
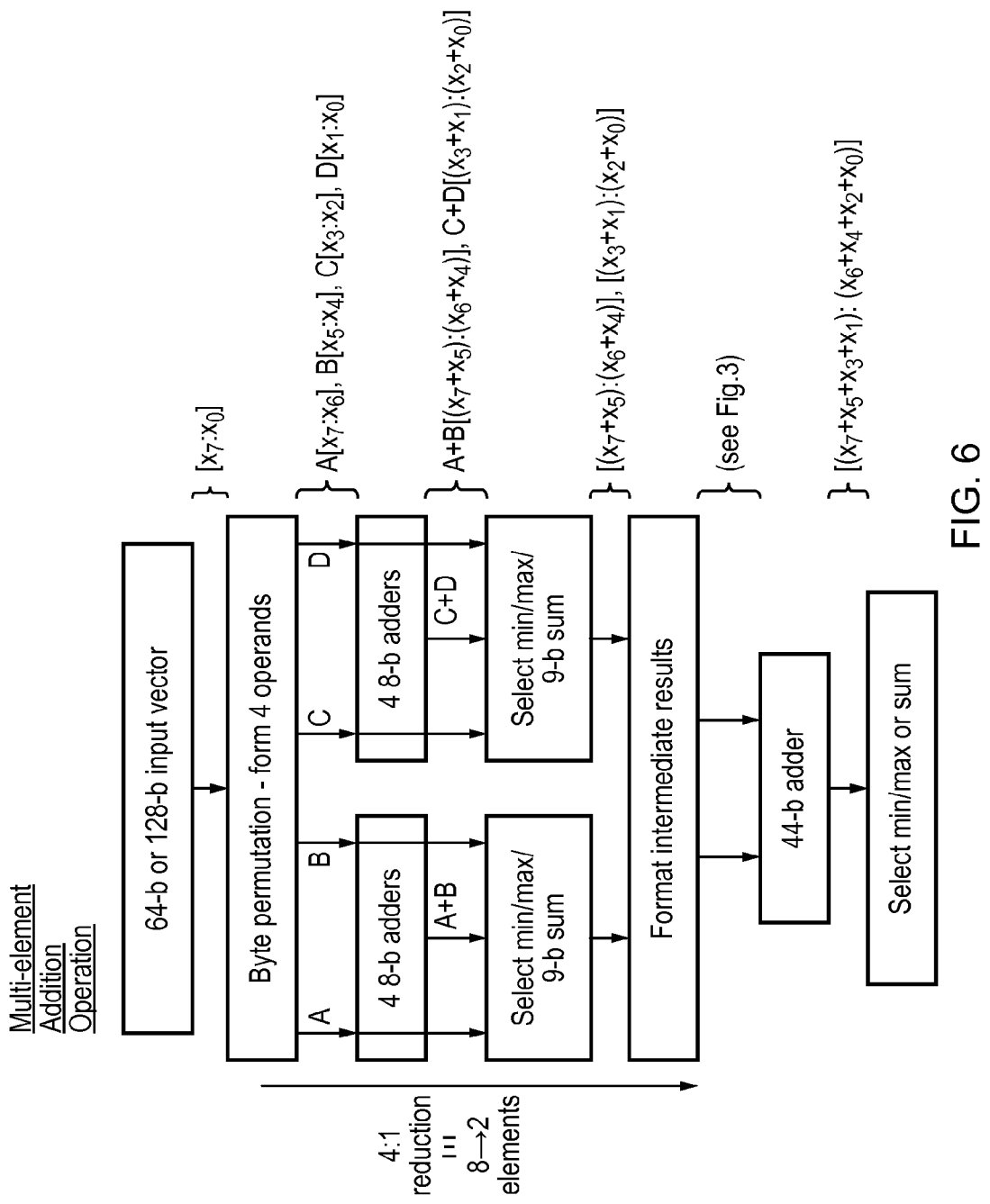

FIG. 6 illustrates a multi-element addition operation. The first intermediate operand forming stage 10 again forms four non-final first intermediate operands from the eight input vectors. These four non-final intermediate operands are then added by the carry propagate adders stage 12 to form two non-final intermediate sum values. The non-final limit value selecting stage 14 does not operate upon these two intermediate sum values, which are instead passed through to the final intermediate operand forming stage 16 where formatting in accordance with FIG. 3 is performed. The output adder stage 18 then performs a carry propagate add to generate, in this example, two partial sum values each representing a sum of four of the input elements. These partial sum values must then be subject to further addition in order to produce a final sum value.

Figure 7:
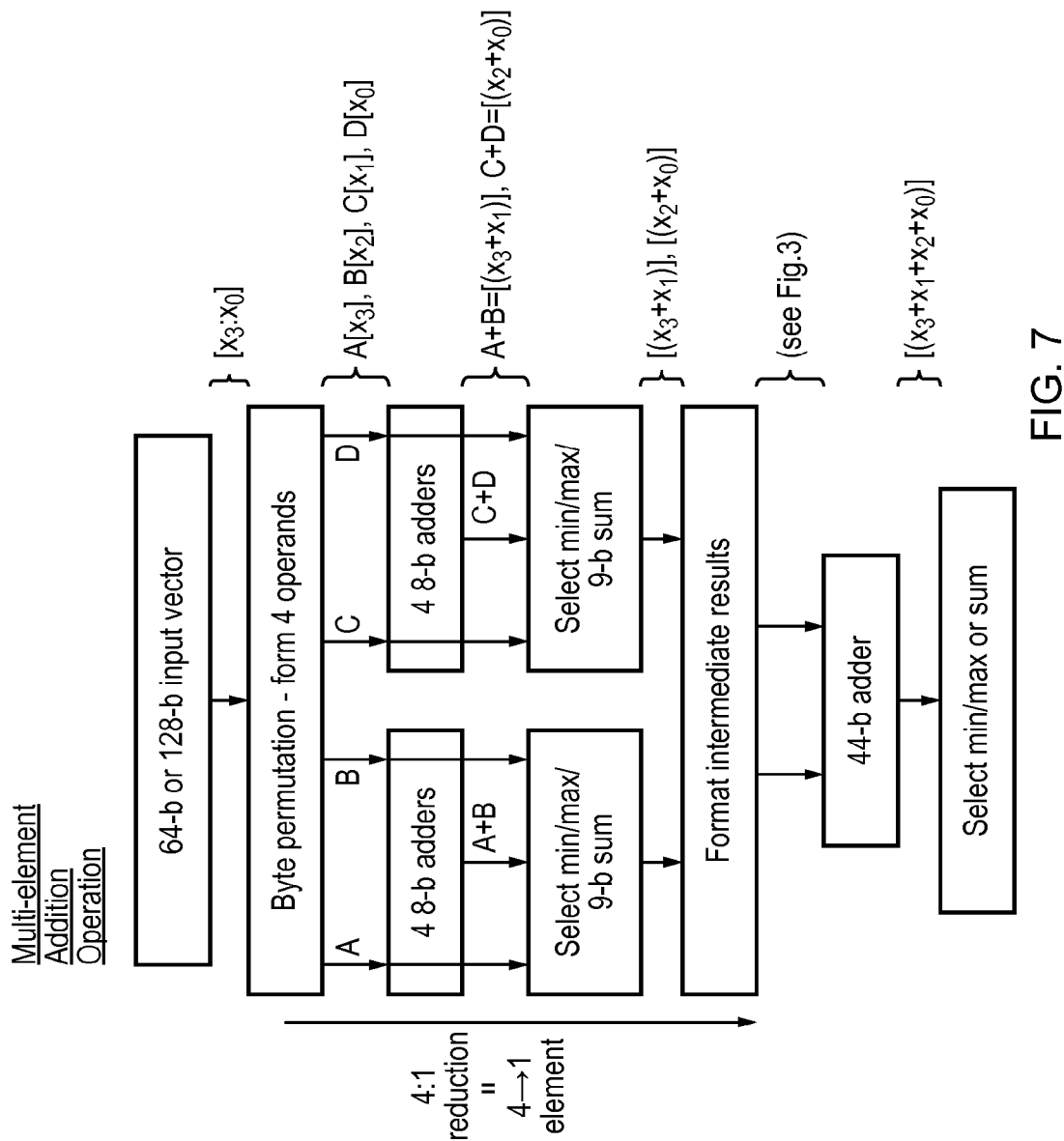

FIG. 7 illustrates another example of multi-element addition, but in this case with a four element input vector. The output from the final limit value selecting stage 19 comprises a final sum value of all the four input elements as the apparatus 8 performs a 4:1 reduction.

Figure 8:
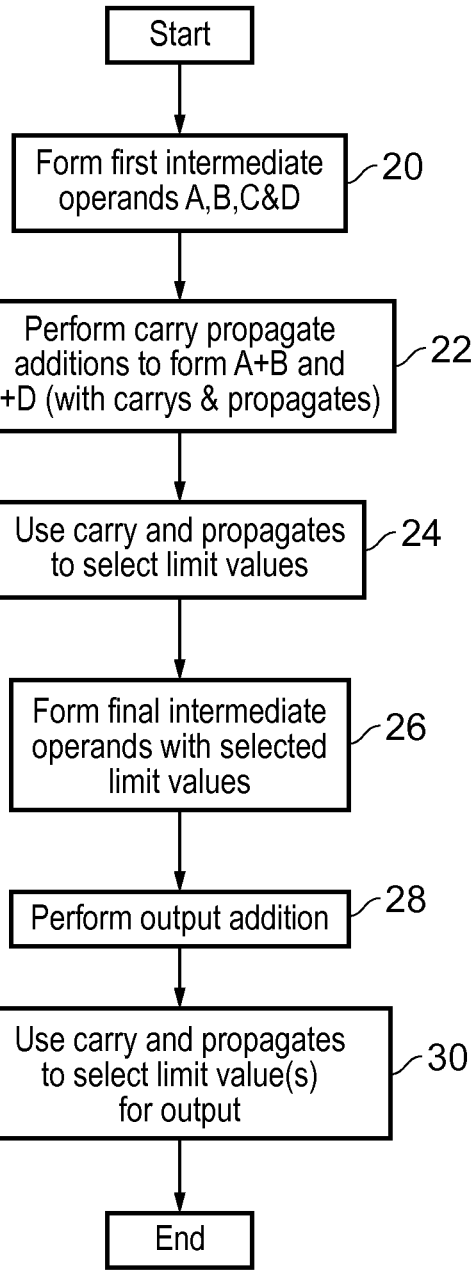
FIG. 8 is a flow diagram schematically illustrating multi-element comparison.

FIG. 8 is a flow diagram schematically illustrating multi-element comparison. At step 20 non-final intermediate operands A, B, C, D are formed. Step 22 performs carry propagate additions to form A+B and C+D with carry and propagate bits being set at various positions. The additions may in fact be subtractions achieved by first negating one of the operands fed to the carry propagate adders.

Step 24 uses carry and propagate bits selected in accordance with the element size to select limit values which are to form final intermediate operands at step 26. Step 28 then performs the output addition and step 30 uses carry and propagate signals within the output value to select the limit values for output (e.g. a single maximum or minimum value, or a pair of candidates for the maximum or minimum value).

Figure 9:
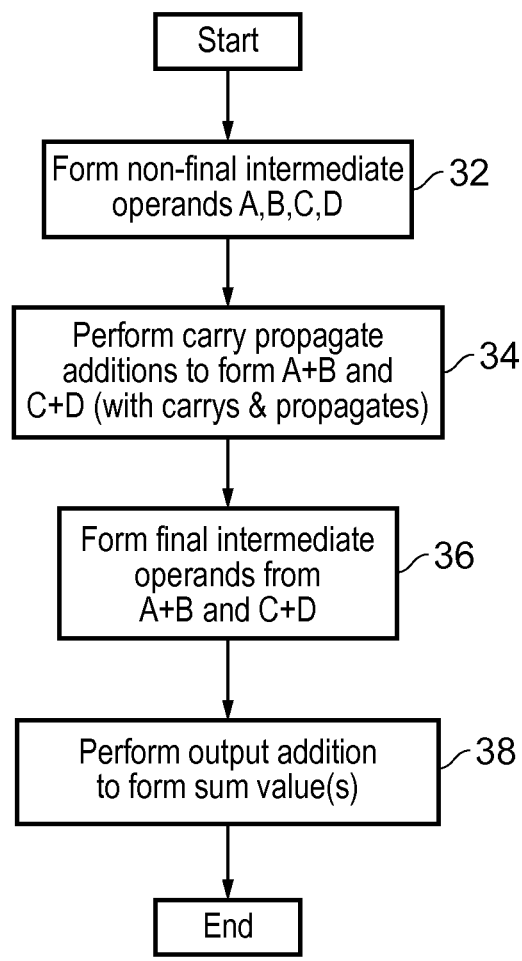
FIG. 9 is a flow diagram schematically illustrating multi-element addition.

FIG. 9 is a flow diagram schematically illustrating multi-element addition. At step 32 non-final intermediate operands A, B, C, D are formed from the multi-element input vector. Step 34 then performs a carry propagate addition to form the two non-final intermediate sum values A+B and C+D. These non-final intermediate sum values have carry values associated therewith which, are added as previously discussed, and combined into the format of the final intermediate operands as illustrated in FIG. 3 using step 36. Step 38 then performs the final output carry propagate addition upon the two second intermediate operands having the format illustrated in FIG. 3.

FIG. 10 schematically illustrates an example embodiment including a plurality of non-final reduction stages and supporting a reduction ratio of greater than 4:1. More particularly, an apparatus having N non-final reduction stages and a final reduction stage can provide a $2^{N+1}$:1 reduction ratio. Each of the non-final reduction stages may include a non-final intermediate operand forming stage, a carry propagate adders stage and a non-final limit value selecting stage achieving a 2:1 reduction. The final reduction stage may include a final intermediate operand forming stage, an output adder stage and a final limit value selecting stage.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. Apparatus comprising:
one or more non-final reduction stages, each non-final reduction stage comprising:
a non-final intermediate operand forming stage to form non-final intermediate operands from one of an input vector and intermediate sum values output from a preceding non-final reduction stage;
a carry propagate adders stage to add respective pairs of said non-final intermediate operands to form intermediate sum values; and
a final reduction stage comprising:
a final intermediate operand forming stage to form final intermediate operands from intermediate sum values output from a last one of said one or more non-final reduction stages; and
an output adder stage to generate an output operand by adding said final intermediate operands;
wherein said apparatus is arranged to perform a selectable one of multi-element comparison and multi-element addition,
wherein said input vector operand comprises N X-bit elements, where X is a selectable positive integer value and N is an integer value of four or more and each of said non-final intermediate operands contains N/4 X-bit elements,
wherein one or more of the non-final reduction stages further comprises a non-final limit value selecting stage arranged, when performing multi-element comparison, to select N/2 limit values that are one of a larger value or a smaller value from a respective pair of X-bit elements that are added together by said carry propagate adders stage, and
wherein, when performing multi-element comparison, said final intermediate operand forming stage forms each of said final intermediate operands to comprise said N/2 limit values selected by said non-final limit value selecting stage.

2. Apparatus as claimed in claim 1 wherein said non-final limit value selecting stage, active when performing a multi-element comparison, is arranged to select, in dependence upon at least carry values generated by said carry propagate adders stage, said N/2 limit values.

3. Apparatus as claimed in claim 1, wherein said final reduction stage comprises a final limit value selecting stage, active when performing a multi-element comparison, to select, in dependence upon at least carry values generated by said output adder stage, limit values that are one or a larger value or a smaller value form a pair of elements.

4. Apparatus as claimed in claim 1, wherein said carry propagate adders stage comprises M Z-bit carry propagate adder circuits, where Z is less than or equal to a minimum value of X that can be selected and M*Z is equal to N*X.

5. Apparatus as claimed in claim 4, wherein when Z is less than X, then said non-final limit value selecting stage selects said limit values in dependence upon both carry values and propagate values generated by said carry propagate adder circuits.

6. Apparatus as claimed in claim 1, wherein, if said final intermediate operand values comprise two or more limit values, then said final intermediate operand forming stage separates said limit values within said final intermediate operands by at least one zero bit disposed between said limit values.

7. Apparatus as claimed in claim 1, wherein, when performing multi-element comparison, said output adder stage selects as said output operand one or more limit values using one or more carry bits generated when adding said final intermediate operands.

8. Apparatus as claimed in claim 1, wherein, when performing multi-element addition, said final intermediate operand forming stage forms each of said final intermediate operands to represent a sum of element values output from said carry propagate adders stage.

9. Apparatus as claimed in claim 8, wherein, when performing multi-element addition, said final intermediate operand forming stage extends outputs from half of said carry propagate adders to represent carry bits generated by all of said carry propagate adders.

10. Apparatus as claimed in claim 9, wherein, when performing multi-element addition, said output adder stage generates as said output operand a sum of said two final intermediate operands.

11. Apparatus as claimed in claim 1, wherein said input vector operand comprises $2^P$ X-bit elements, where P is an integer of two or more.

12. Apparatus comprising:
one or more non-final reduction stages, each non-final reduction stage comprising:
non-final intermediate operand forming means for forming non-final intermediate operands from one of an input vector and intermediate sum values output from a preceding non-final reduction stage;
means for adding respective pairs of said non-final intermediate operands to form intermediate sum values; and
a final reduction stage comprising:
final intermediate operand forming means for forming final intermediate operands from intermediate sum values output from a last one of said one or more non-final reduction stages; and
output adder means for generating an output operand by adding said final intermediate operands; wherein
said apparatus is arranged to perform a selectable one of multi-element comparison
and multi-element addition,
wherein said input vector operand comprises N X-bit elements, where X is a selectable positive integer value and N is an integer value of four or more and each of said non-final intermediate operands contains N/4 X-bit elements,
wherein one or more of the non-final reduction stages further comprises a non-final limit value selecting means for selecting, when performing multi-element comparison, N/2 limit values that are one of a larger value or a smaller value from a respective pair of X-bit elements that are added together by said means for adding respective pairs of said non-final intermediate operands, and wherein, when performing multi-element comparison, said final intermediate operand forming means forms each of said final intermediate operands to comprise said N/2 limit values selected by said non-final limit value selecting means.

13. A method of operating an apparatus comprising one or more non-final reduction circuits and a final reduction circuit, said method comprising the steps of:

within each of said one or more non-final reduction stages:

forming, with a non-final intermediate operand forming circuit, non-final intermediate operands from one of an input vector and intermediate sum values output from a preceding non-final reduction stage;

adding, with a carry propagate adder circuit, respective pairs of said non-final intermediate operands to form intermediate sum values; and within said final reduction circuit:

forming, with a final intermediate operand forming circuit, final intermediate operands from intermediate sum values output from a last one of said one or more non-final reduction circuits; and generating, with an output adder circuit, an output operand by adding said final intermediate operands;

wherein said method performs a selectable one of multi-element comparison and multi-element addition, wherein said input vector operand comprises N X-bit elements, where X is a selectable positive integer value and N is an integer value of four or more and each of said non-final intermediate operands contains N/4 X-bit elements, and wherein one or more of the non-final reduction circuits further comprises a non-final limit value selecting circuit, and when performing multi-element comparison, said method further comprising:

selecting, with said non-final limit value selecting circuit, N/2 limit values that are one of a larger value or a smaller value from a respective pair of X-bit elements that are added together by said adding, and forming, with said final intermediate operand forming circuit, each of said final intermediate operands to comprise said N/2 limit values selected by said non-final limit value selecting circuit.

* * * * *